United States Patent [19]
Crocker et al.

[11] Patent Number: 5,452,519
[45] Date of Patent: Sep. 26, 1995

[54] ATTITUDE SENSOR

[75] Inventors: Timothy R. Crocker, Exeter; Anthony I. Rees, Godalming, both of United Kingdom

[73] Assignee: 3D Instruments Limited, Norfolk, United Kingdom

[21] Appl. No.: 157,100

[22] PCT Filed: May 29, 1992

[86] PCT No.: PCT/GB92/00978

§ 371 Date: Nov. 30, 1993

§ 102(e) Date: Nov. 30, 1993

[87] PCT Pub. No.: WO92/21936

PCT Pub. Date: Dec. 10, 1992

[30] Foreign Application Priority Data

May 31, 1991 [GB] United Kingdom ............ 9111740

[51] Int. Cl.[6] .................... G01C 9/06; G01C 17/02
[52] U.S. Cl. .................... 33/366; 33/346; 33/355 R
[58] Field of Search .................... 33/319, 344, 345, 33/346, 366, 355 R

[56] References Cited

U.S. PATENT DOCUMENTS 4,344,235 8/1982 Flanders .................... 33/366

FOREIGN PATENT DOCUMENTS

| 0160444 | 11/1985 | European Pat. Off. . |
| 0179552 | 4/1986 | European Pat. Off. . |
| 2123906 | 9/1972 | France . |
| 408936 | 4/1934 | United Kingdom . |
| 798089 | 7/1958 | United Kingdom . |
| 844815 | 8/1960 | United Kingdom . |
| 992535 | 5/1965 | United Kingdom . |

OTHER PUBLICATIONS

Patent Abstracts of Japan, vol. 11, No. 79 (P–555) (2526), Mar. 11, 1987: Abstract of Japanese Published Patent Appln. No. 61–237011 (Oct. 22, 1986).

Soviet Inventions Illustrated, Week E02, Feb., 1982, Derwent Publications, Ltd., Abstract of SU 823 885 (Apr. 23, 1981).

Primary Examiner—Alvin Wirthlin
Attorney, Agent, or Firm—Sherman & Shalloway

[57] ABSTRACT

An attitude sensor comprises a spherical ball suspended in a fluid contained in a housing. The ball is maintained neutrally buoyant with respect to the fluid and out of direct contact with the housing. A means is provided for detecting the orientation of the ball. The sensor is particularly useful as a compass, in which case one or more magnets may be provided within the ball or a passive magnetic element is provided which is influenced by the earth's magnetic field.

11 Claims, 9 Drawing Sheets

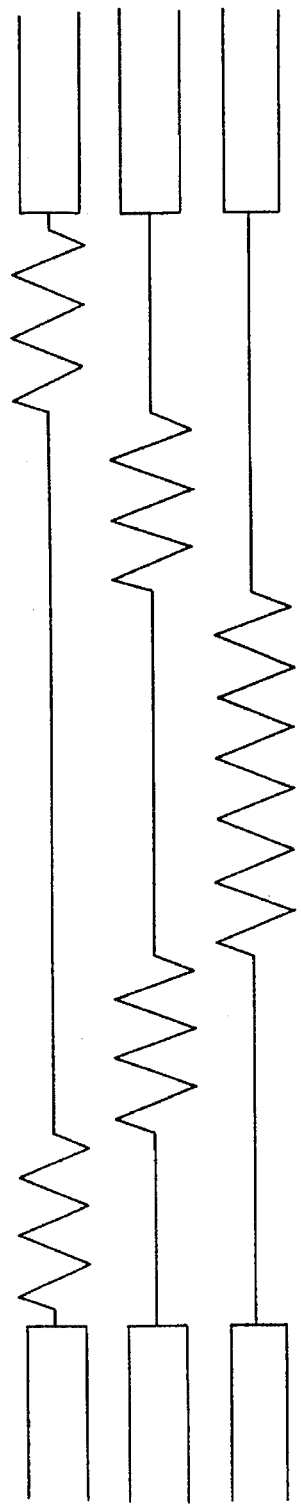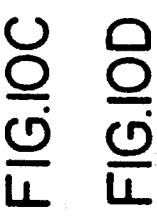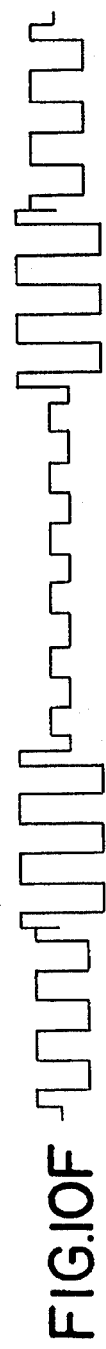
FIG.10A
FIG.10B
FIG.10C
FIG.10D
FIG.10E
FIG.10F

ATTITUDE SENSOR

The present invention relates to attitude sensors and in particular to such sensors as may be used in or to form compasses, attitude and rotation rate measurement devices or combinations of these.

Magnetic compasses and other types of attitude sensors, in a form that can be read by computers and other electronic devices, are important in numerous fields, sea surface and subsea vessels, land vehicles, aircraft, rockets, and so on. Existing sensors have had many forms and paths of development, and are often combined to give specific types or sets of data.

Traditional magnetic compasses use a needle or card which points toward magnetic north, and some form of suspension to allow its surroundings to rotate around it. As compasses have been developed to be electrically readable, this basic arrangement has been modified, with many forms of gimbals and suspension. Other approaches have used various non-moving forms of magnetic sensors, sometimes coupled to other sensors which determine a local gravitational reference from which essentially the same information can be derived.

Physical analysis shows that to obtain a true 'magnetic north' reading it is actually also necessary to have a second reference usually the vertical which defines the horizontal plane in which it is defined; even in the simplest case where the compass is simply mounted on a horizontal surface, this reference is implicit since it was used in some form to level the surface. This is so (except on the magnetic equator), because the couple on the needle is such as to make it want to align with the earth's magnetic field lines, which normally dip below the horizontal. A simple compass card is kept level against the dip torque by a very much larger gravitational torque. Any error in levelling of a simple compass in the magnetic east-west direction (or of the reference used in a static magnetic sensor) will lead to quite significant compass reading errors.

Any gravitational reference is however inevitably affected by linear accelerations applied to its package, since these cannot be distinguished from changes in the direction of the gravitational field. This inevitably leads to compass reading errors when the compass package is subject to motion. In many situations the accelerations are short term, and probably reversing or cyclic, so these effects may be reduced by the use of some form of mechanical damping. This solution unfortunately agravates the effects of the other possible type of external motion, where the package is rotated.

These effects are interactive, and can produce complicated compromises in performance.

It is fundamental that no device that is subject to sustained linear acceleration can find a true gravitational reference. It is equally certain that no acceleration can be extended infinitely in time. A solution can therefore be found in the majority of practical cases, by reducing the effects of the influence of acceleration, if the natural period of the device in question can be made very much longer than the duration of the applied acceleration.

In the case of external rotations, the tendency of any object is to stay stationary in space. Any tendency to rotate with the surroundings is due to the coupling of this motion from the outside. In the case of a compass in gimbals this is due to friction in the gimbal bearings.

The situation is slightly different in analysis between the cases of frictional influence on an object with both a magnetic and a gravitational moment (ie a compass card of some form), and that of one with no such moment (a rate sensor), and other cases of where the influence is magnetic only, and/or gravitational only. However in general terms the conclusion of the analysis is a re-statement of the simplest laws of mechanics; for a body to stay still in space (and thus act as the heart of a sensor of this sort) it should have the lowest frictional coupling to the outside world, and the highest moment of inertia possible (within its practical constraints).

According to the invention there is provided an attitude sensor comprising a housing containing a fluid, a substantially spherical ball freely suspended in the fluid and means for maintaining the ball out of direct contact with the housing characterised by active means for ensuring that the ball is neutrally buoyant with respect to the fluid and means for detecting and transmitting the orientation of the ball.

According to other aspects of the invention there are provided novel methods of measuring displacement and orientation and for controlling buoyancy. In a further aspect of the invention a novel method and device for balancing is disclosed in which several metal electrodes in an electrolyte such as copper in a copper sulphate solution spaced apart, a particular one or more said electrodes being connectable to a power source in accordance with the required shift of balance.

It will be appreciated that a spherical object, suspended (by its simple buoyancy) in a liquid of zero viscosity, and with no mechanical connection at all to its surroundings, and with no gravitational or magnetic moments, will at all times maintain its absolute orientation or rate of motion in space, irrespective of the motions of its housing. Clearly all fluids have non-zero viscosity, but if the ratio of the moment of inertia to the viscous coupling of the liquid is sufficiently high, such a device provides the basis of a rotation rate sensor, sensitive to cyclic rotations down to a certain practical limit in frequency (with frequency dependence), insensitive only to continuously sustained rotations. If the ball has a gravitational moment (righting moment) then it will in the static case settle vertically, and so can provide the basis, with similar caveats, of an attitude sensor. Such a ball with a magnetic moment would be essentially the heart of a dip or total field sensor, and a combination of magnetic moment and gravitational moment would provide the equivalent of a classic magnetic compass. All such devices singly or in combination would be intrinsically capable of providing three dimensional attitude information.

Preferably the means for ensuring that the ball is neutrally buoyant, hereafter referred to as the "buoyancy control" comprises means for pressuring the fluid in the housing and a variable volume chamber within the ball in pressure communication with the fluid.

Preferably the means for maintaining the ball out of direct contact with housing, hereafter referred to as the "displacement control" comprises at least one electrode in the ball and a plurality of electrodes in the housing, means to apply an electrical potential to one or more electrodes in the housing, the arrangment being such that ball and housing electrodes cooperate to prevent the ball being in direct contact with the housing by electrostatic attraction so produced. Preferably a means to provide power within the ball to enable displacement control and/or orientation measurement is provided by capacitative coupling between the housing and ball electrodes.

Preferably the means for detecting the orientation of the ball, herafter referred to as the "orientation detector" comprises at least one ball electrode, a plurality of housing electrodes and means for capacitive measurement as between the ball and housing electrodes.

The ball may be provided with a balancing means comprising a sealed cell orientated in a plane defining a horizontal plane within the ball, the cell containing metallic electrodes and an electrolyte and a control means arranged to move metallic material of live metallic electrodes within the cell to adjust the centre of gravity of the ball.

The ball may contain one or more bar magnets to provide a magnetic righting moment. The bar magnet or magnets may be disposed vertically within the ball to provide a gravitational righting movement. A vertically orientated sealed cell containing metallic electrodes and an electrolyte with a control means may be provided to move the metallic material of the metallic electrodes with the vertical cell to assist in controlling the centre of gravity and the righting moment of the ball.

Alternatively the ball may contain a passive magnetic element comprising one or more ellipsoidal discs or annuli of highly susceptible soft magnetic material such as transformer iron with little or no permanent magnetism. The induced magnestism in such a disc or annulus will produce a torque tending to bring its diametral plane onto a plane containing the earth's field direction. If this is combined with a gravitational righting moment the or each disc or annulus becomes a compass needle in the horizontal plane but is without any magnetic torque tending to rotate if in its own plane.

Operation of the device is preferably made possible by the use of electronic signal processing circuitry, and typically a microprocessor to perform control and measurement function.

An embodiment of the invention will now be described with reference to the accompanying drawings in which:

FIG. 10 is a diagram of signals on the ball and housing electrodes; and

Figure 1:
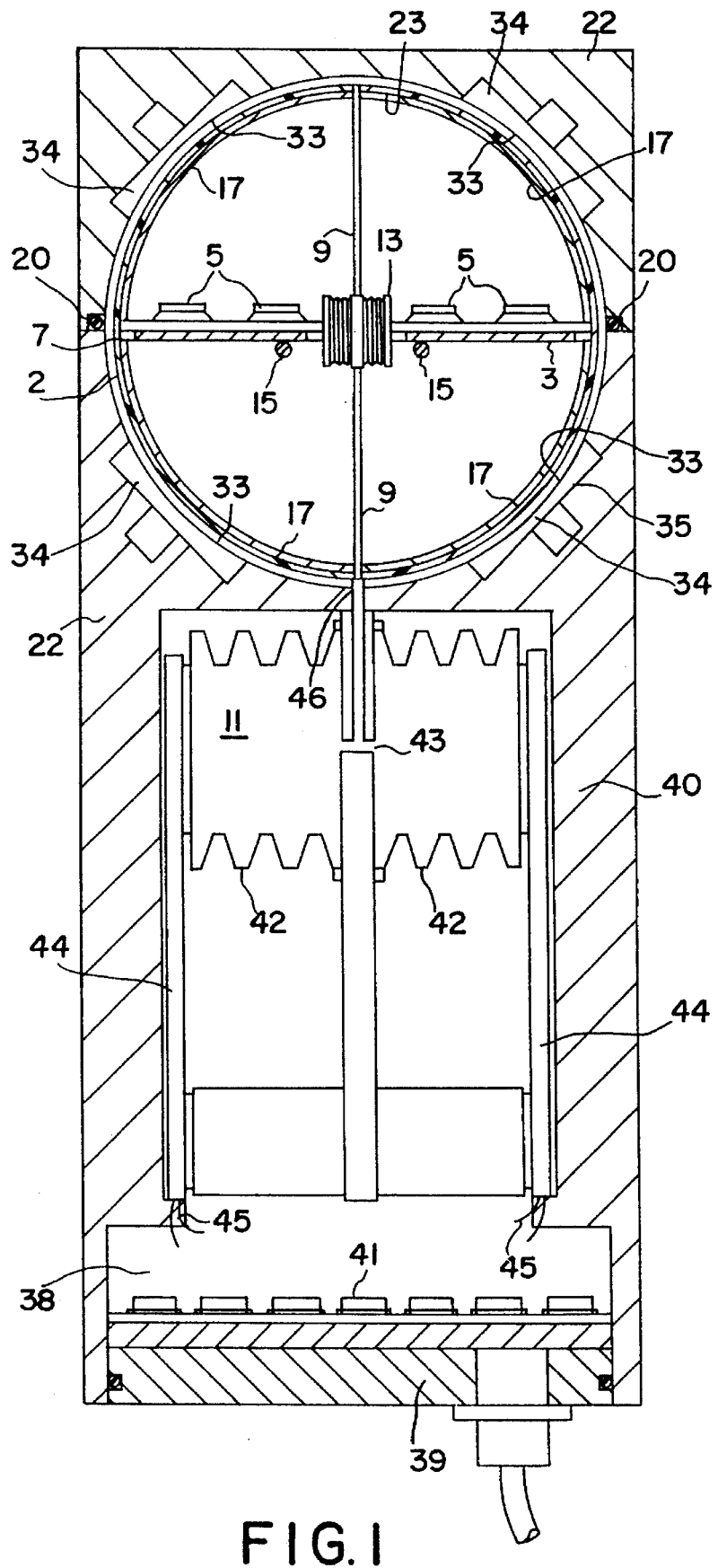
FIG. 1 is a partially sectioned view of the attitude sensor of the invention having a spherical ball suspended in fluid in a housing.

FIG. 1 shows the general arrangement of the ball of the attitude sensor. The outer shell 2 may be constructed in numerous ways, but typically is of a glass reinforced epoxy resin, precision moulded in two hemispheres, and glued together on final construction. On, or close to the equatorial plane there is an electronic printed circuit board 3 carrying on it the electronic components 5 necessary for its operation. On one side is carried the electrolytic auto balance cell 7 (shown in greater detail in FIG. 6). Running from one 'pole' to the other is a thin tube 9, open at both ends so as to communicate with external suspension fluid 11, but sealed into the shell 2 so that it remains fluid-tight. The centre of the tube carries a small symmetrical bellows arrangement 13, typically made of spun brass or phosphor bronze material, with the inside volume of the bellows in communication with the fluid in the tube 9, and thus with the surrounding suspension fluid, but with the bellows arrangement sealed to the tube so as to preserve the fluid tightness of the main volume inside the ball. In a compass configuration the ball will also contain one or more bar magnets 15 to provide the necessary magnetic moment.

Figure 2:
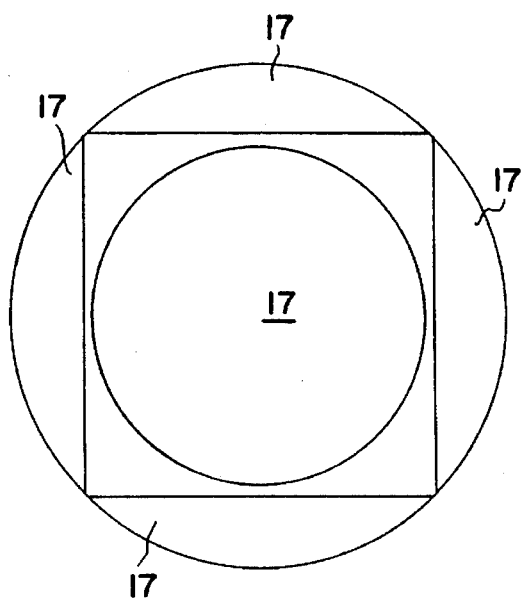
FIG. 2 is a diagram of the electrode array of the ball of FIG. 1 according to one embodiment.
Figure 3:
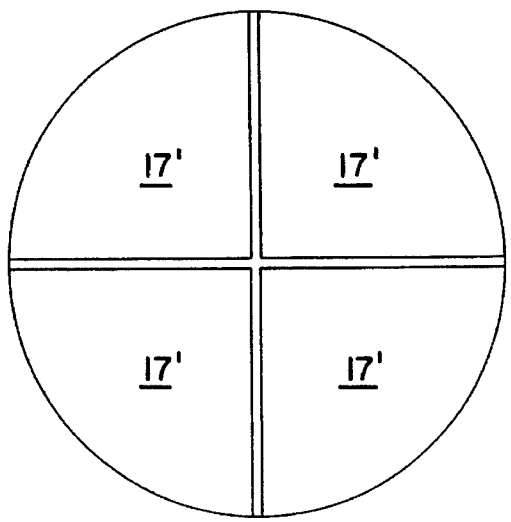
FIG. 3 is a diagram of the electrode array of the ball of FIG. 1 according to a second embodiment.

The surface of the shell 2 of the ball carries electrodes 17 shown in FIG. 2, in this example cubic symmetry is used, with six electrodes all of equal size such that they are as large as possible whilst maintaining adequate separation for electrical isolation one from the other (the pattern of electrodes is that which would be obtained from a projection onto the surface of the sphere from circles placed at the centres of the faces of a surrounding cube. Alternatively eight electrodes 17' are provided for the ball as shown in FIG. 3. Construction of the electrodes may typically be by vacuum deposition of a thin metallic film onto the surface of the sphere, by embedding metallic mesh or foil within the composite make-up of the shell, by use of conductively loaded epoxy compounds in the build of the shell, or by application of thin formed metallic shells to the shell. These electrodes communicate electrically with the circuitry on the printed circuit board by wire or other links. Typically the surface of the ball will be coated overall by a thin layer of non-conductive paint, to aid in set-up, and protect the ball. The surface of the ball in between the electrodes may be similarly made conductive, and all such areas connected to the common potential point of the ball electronics, in which case only thin non-conductive lines describe the electrode areas. Equally the electrodes may be designed to symmetrically fill the whole surface of the sphere, making them square in projection. Other geometries such as four electrodes arranged tetragonally may also be employed. For some purposes of the sensor only three or even two electrodes may be needed.

Figure 4:
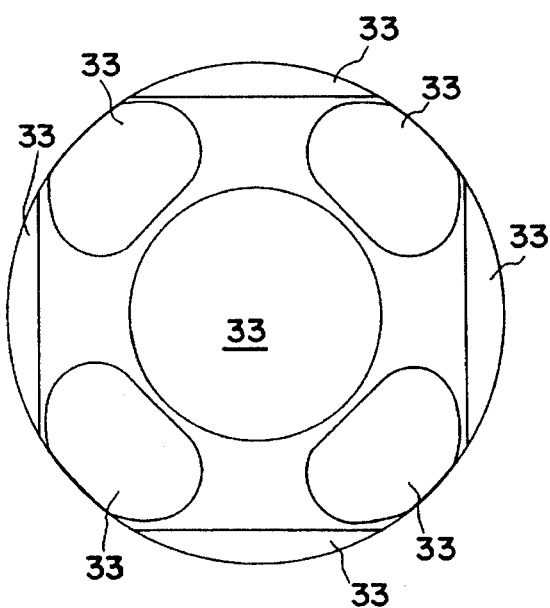
FIG. 4 is a diagram of the electrode array of the housing of FIG. 1 according to one embodiment.
Figure 5:
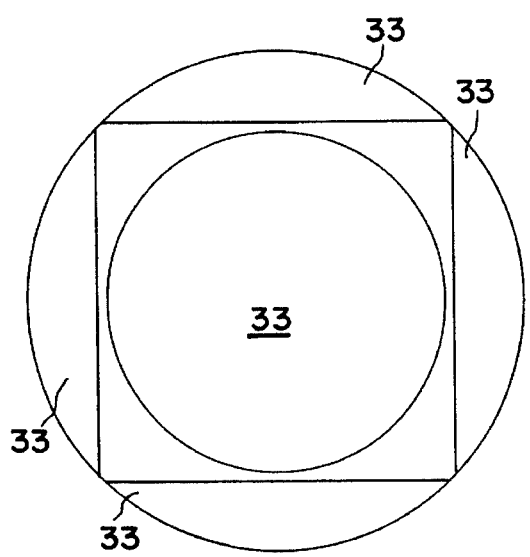
FIG. 5 is a diagram of the electrode array of the housing of FIG. 1 according to a further embodiment.

The housing 22 for the device is shown very schematically in FIG. 1. It is essentially a liquid tight housing, presenting a spherical (or functionally spherical) inner surface 23 to the ball and having an equatorial seal 20, the housing being, slightly larger than the ball (for a typical ball diameter of 50 mm, the diameter of the inner surface may be 51 to 52 mm). The inner surface 23 also presents a number of electrodes 33, again in the form of spherical caps 34, conforming to the inner spherical surface, but generally not the same number of electrodes as on the ball. For the preferred configuration of six electrodes on the ball, the preferred number of electrodes 33 on the housing would be fourteen, again all of equal size, as large as possible so as to just not touch, but now arranged so as to be not only centred on the projections of the centres of the cube faces (again six electrodes), but now with an additional eight that are in the interstices, the projections of the eight corner points of a cube onto the spherical surface. The disposition of these electrodes 33 is shown diagramatically in FIG. 4 or FIG. 5 where only six electrodes are present. Again, the gaps between the electrodes may also to advantage be conductive, and connected to the common potential point of the outer analogue electronics. To achieve good electrical shielding it is envisaged that each outer or housing electrode 33 will be an integral part of its own simple electronics package and cap 34, with an electrically conductive outer skin 35 covering all external surfaces except the electrode itself, abutting, but not electrically connected to, the electrode along the circumferential edge. A pump 40 for buoyancy control, and control electronics 41 are typically integrated into the outer housing in a chamber 38 having a sealing end cap 39.

A pump 40 for buoyancy control is shown in FIG. 1 and comprises a balanced pair of spun metallic bellows 42 containing suspension fluid 11 in communication with each other via conduit 43 and via a central conduit 46 with suspension fluid 11 in the housing 22. A two layer piezoceramic "bender" motor element 44 which bends on application of voltage across supply leads 45 controls the extension of each bellows 42 and hence the pressure of fluid 11.

Figure 6:
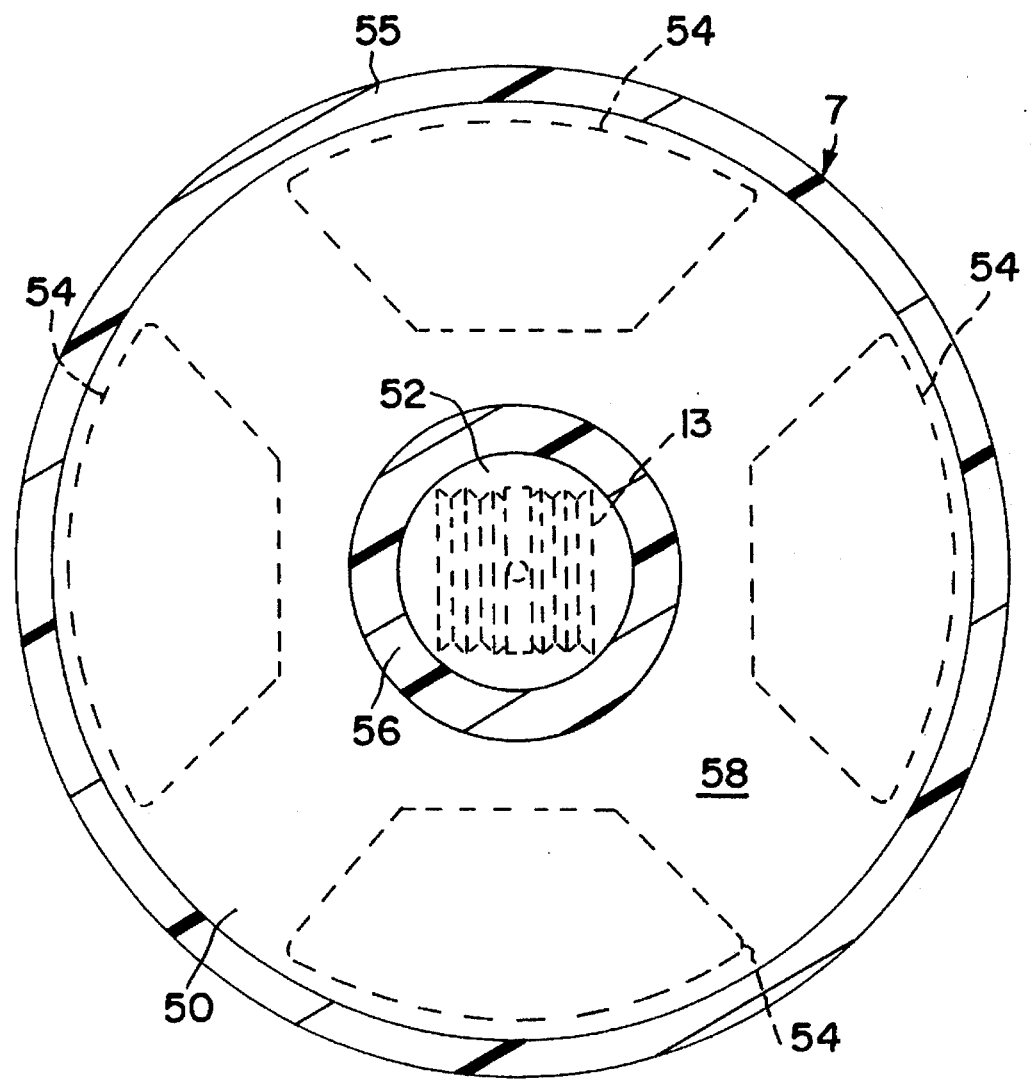
FIGS. 6 and 6A are a sectional plan and vertical diametrical sectional view of a balance cell for the ball of FIG. 1.

Balance cell 7 see FIG. 6 comprises an annular disc 50 formed with a central hole 52 for bellows 13. The disc has a base 53 with four copper electrodes 54 formed as a printed circuit board (PCB). Circular epoxy raised walls 55 and 56 enclose with base 53 and epoxy/glass compliant lid 57 an annular space 58 filled with a copper sulphate solution. The operation of the balance cell 7 will be subsequently described.

1. Operation and Function of Parts

Orientation and Displacement Measurement.

Power for the ball 1, as described in detail below, is provided by an application of an AC signal to some or all of the outer electrodes. A measurement cycle is triggered by cessation of this signal, which is detected within the ball. The orientation is derived by determining the degree of area overlap of each of the inner or ball electrodes 17 with each of the outer or housing electrodes 33, by making a measurement of the capacitance formed by each electrode set, with the suspension fluid 11 as dielectric.

In the preferred embodiment, electrodes, both inner 17 and outer 33, are used in opposite pairs, three pairs on the inner surface, and seven pairs on the outer. Following the cessation of the power signal from the outside to the ball, the ball electronics transmits a few cycles of a triangular voltage waveform signal, on each pair of electrodes in turn (and the back in reverse order) transmitting the signal differentially (that is equal and opposite voltage signals on each of the electrodes in the pair), and maintaining the centre (or local common potential) on the four other electrodes. This cycle is shown schematically in the timing diagram, FIG. 10. (the frequency of the triangular waveform might for example be 1000 Hz). FIG. 10 is a timing diagram for measurement burst showing signals on inner and outer electrodes. The top trace (A) shows the voltage waveform on a typical outer electrode, starting with the ball power phase, which is then shown to cease. The second trace (B) shows the trigger signal generated inside the ball, on detection of the cessation of power drive from the outside. The third, fourth and fifth traces (C, D and E, respectively) show the drive voltage applied differentially to each pair of electrodes from the electronics within the ball (these are not shown differentially for simplicity, one electrode in a pair would have the voltage shown, the other the opposite).

These are voltage signals applied across the inner electrodes 17. The outer electrodes 33 are connected to current amplifiers, shown in a simplified form in FIG. 7. The capacitance, shown in a dotted box 60, is that formed from the overlap of an inner and outer electrode, with the suspension fluid as dielectric. To a first order it is directly proportional to the area of overlap (from which the distance between the centres of the electrodes may be deduced, see below). The whole circuit, including this capacitance forms a standard differentiating arrangement, thus for a triangle drive 711 from the inside of the ball, the output at point B on FIG. 7 will be a square waveform, with amplitude proportional to the degree of area overlap of the electrodes. Note in FIG. 8 Capacitor Ci>>electrode capacitance, resistor Ri>>Rf, point A is a virtual earth, RiCi>>input waveform period and therefore Ri does not affect Ac operation.

Figure 7:
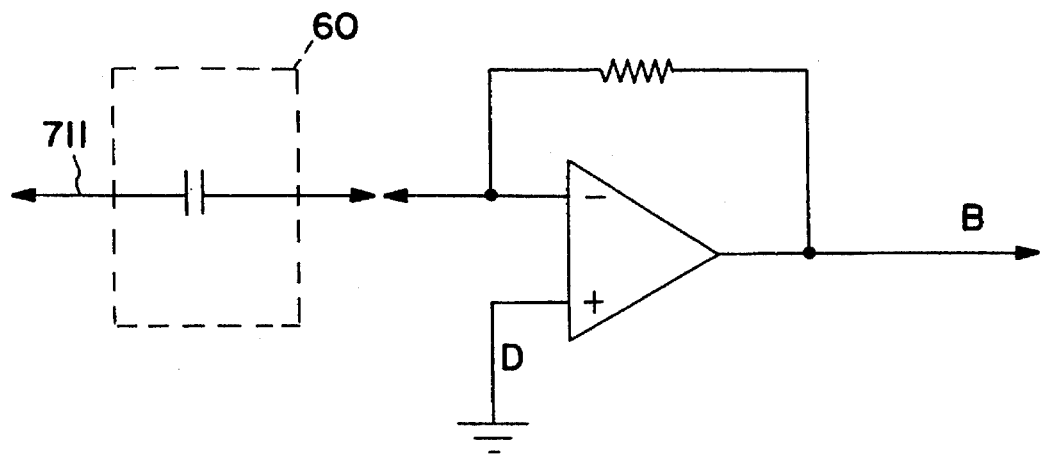
FIG. 7 is a circuit diagram of an input circuit per electrode of FIG. 4.

The basic circuit configuration of FIG. 7 has other practical advantages; in this receiver mode the most important is that the amplifier maintains the outer electrodes at 'virtual earth', ie as close to the external signal common potential as the limitations of the amplifier allow. This has two principle benefits; it reduces the effects of stray capacitative coupling on the input circuitry, and electrode itself, and together with filling the interstices between the outer electrodes with conductive areas connected to external signal common, it equalises the load seen by the inner drive circuits under all possible orientations.

All fourteen of the outer electrodes are connected in the same way. Each inner electrode 17 can overlap to some extent with up to five outer electrodes 33 at one time, so up to five pieces of amplitude information can be obtained from each of the six segments of the transmission cycle. The last trace (F) of FIG. 10. shows an idealised voltage waveform from one of the fourteen amplifiers of FIG. 7, where the output is shown as a squarewave, with the amplitude and phase varying to represent the phase and amplitude variation that would result from the different degrees of overlap and orientation in a real situation.

Figure 11A:
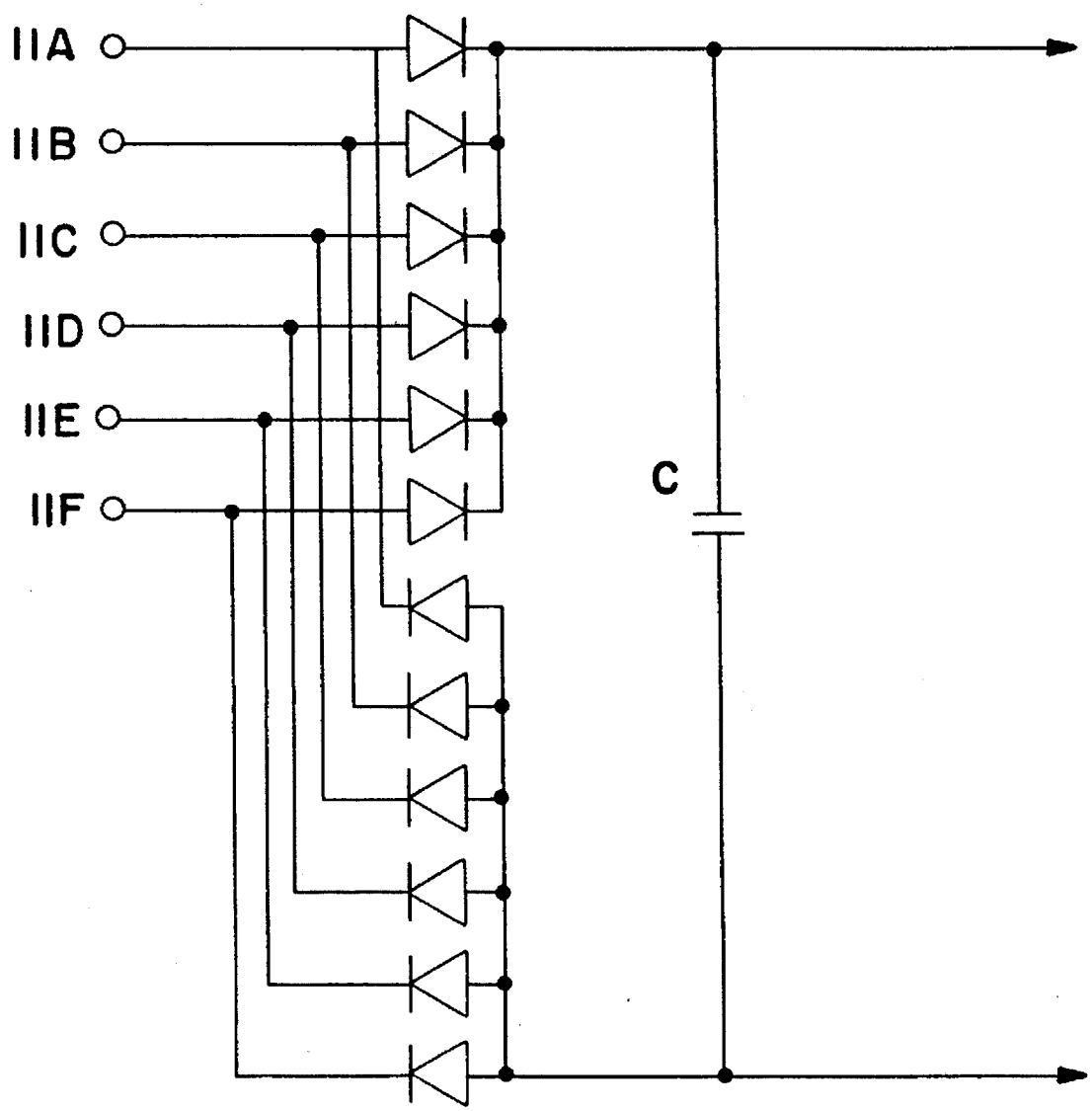
FIG. 11 is a block diagram of the ball circuitry.
Figure 11B:
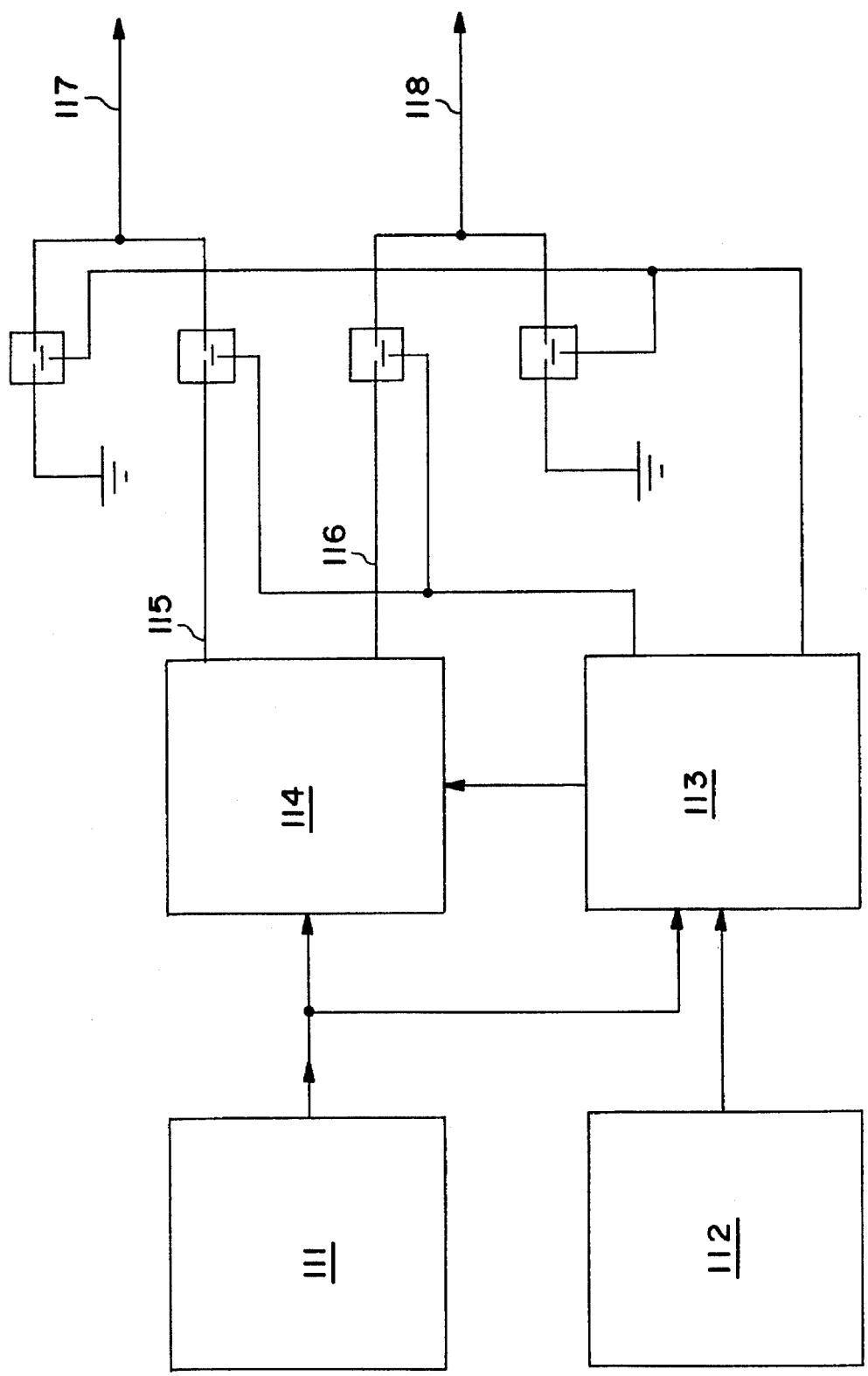

FIG. 11 is a block diagram of ball circuitry, including details of charging arrangement additional circuitry for balance cell(s) not being shown. In FIG. 11 (½), the capacitor C charges and powers the rest of the circuit, each of the leads 11A, 11B, 11C, 11D, 11E and 11F being connected to an electrode on the ball. In FIG. 11 (2/2), the watch crystal clock 111 and the charging detection logic 112 both feed signals to cycle logic 113 which controls the triangular waveform generator 114 which produces phase and antiphase signals on leads 115 and 116, respectively, which are fed to an electrode pair via leads 117 and 118, respectively.

If the ball were genuinely centred in the housing, then it would in principle only be necessary to measure the signal amplitude from one outer electrode 33 in each pair.

Figure 9:
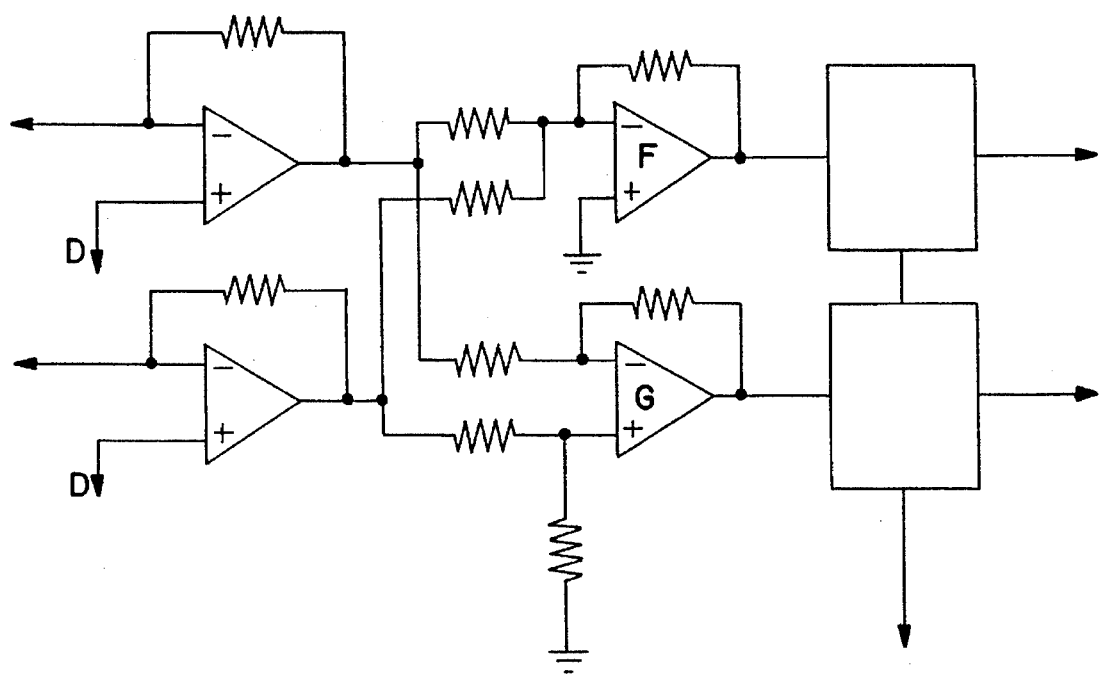
FIG. 9 is a circuit diagram of amplifiers for orientation and displacement information for each of the electrodes of FIG. 4.

However, in reality the ball may be displaced slightly, and since the gap between the electrodes also enters into the formula for the capacitance formed by the overlap of an inner and outer electrode, it is necessary both to correct for the measurement errors that this displacement creates, and to measure the displacement itself. This is done using the outer amplifier configuration shown in FIG. 9, using sum and difference amplifiers following the input differentiators of FIG. 7. (it important to be clear as to the terminology here, since the differential nature of the signal may lead to confusion). Amplifier F is configured as a summing amplifier (also inverting, but this is immaterial). Since its output is the algebraic sum of two signals that have been transmitted differentially, its output will be zero for inputs that are exactly equal and opposite, as would be the case if the ball were placed exactly centrally between the outer electrodes. Any small displacement of the ball will be evident as a small signal, proportional to the amount of the displacement from the central position, and to the area of overlap of the electrodes. Amplifier G is configured as a difference amplifier. Its output therefore recovers the full differential signal (summing with sign reversal on one side). If the ball is slightly displaced then one signal would be slightly larger than the correct value, and one slightly smaller. Summing in this way thus recovers the correct overlap signal, free of first and second order errors. Note that this method is very common in electronic signal processing, but would not work here if only the differential ball signal were coupled to the electrodes, 10 since in this case the two capacitors formed by the opposite pair overlaps of the inner and outer electrodes are effectively in series, and the currents into the differentiators will by definition be equal and opposite, so that the output of amplifier F would at all times be zero. However, this system does work here because the undriven ball electrodes are not passively floating, but held to the centre point of the ball differential drive signal. These peripheral electrodes couple capacitatively to the virtual earths of all the outer electrodes (and if used the grounded areas in between) and thus provide a relatively tightly coupled centre reference point for the received signals, by which the analysis of operation above is correct. Outputs of amplifiers F and G are squarewaves. These can be converted to 'DC' amplitude values by the use of precision rectifiers or synchronous detectors, giving seven signal pairs, each with six periods corresponding to the six periods of the transmit cycle. These signals are fed to analogue to digital conversion circuitry, and then to a microprocessor or other means for computing the area overlaps. Once overlaps have been derived, numerous processing techniques can be used to derive both orientation and displacement values. Essentially the area overlaps lead immediately to a set of values of distances along great circle arcs on the surface of the sphere between the electrode centres. These can then be solved to give cartesian displacements, in terms of latitude and longitude, of the casing with respect to the inner or vice-versa.

It is expected that one microprocessor will be integrated into the electronics of the system, to control this measurement process, and perform the other tasks specified below. It will be able to communicate via standard computer data protocols with other devices, taking commands, and outputting data in a numerical format. One final point must be made. This device is intended to provide good data whilst the package is moving. This is the reason for the use of the repeated reverse order measurement cycle. Since the time to make a complete measurement of position is relatively small (a few milliseconds or tens of milliseconds), relative movement between the electrodes will have been small. Averaging the positions given by the first and second readings of each electrode transmission will thus give answers centred on the same moment in time.

2. Control of Buoyancy

If the ball is at all times exactly neutrally buoyant in the suspension fluid, then it will have no tendency to move bodily within the fluid, (although if it has a gravitational moment it will experience a torque) despite any acceleration imposed on the outside. This exact neutral buoyancy is needed not only to enable the basic measurement cycle, but because it protects the ball within the fluid from moving even under shock loads from outside, and thus makes the system very rugged. Manufacture of a body that matches mass and volume to the density of a fluid to the desired accuracy is very difficult, but in any case would be made pointless by changes in temperature of the device if the temperature coefficients of buoyancy could not also be matched. A practical method of maintaining neutral buoyancy is to use a dynamic method, as has been briefly described. This is in fact the same technique that is used in the old diver in a bottle toy. A small, fluid filled compliant volume within the ball is connected to the fluid. Changes in the ambient fluid pressure will cause the compliance to change volume, thus directly altering the buoyancy of the ball. In order not to alter the 10 gravitational righting moment of the sphere (if any) and the sphere dynamic characteristics, the centre of action of compliance should be at all times at the centre of buoyancy (in a sphere the geometric centre) of the ball. The method suggested using bellows at the centre achieves this, although this could equally be done by making the ball shell itself compliant, or other detail techniques. The necessary pressure changes are achieved by use of a small electrically operated displacement pump, communicating with the suspension liquid from the outside. The design of the pump itself is not critical, except of course that it should not be magnetic for use as a compass. FIG. 1 as previously referred to show the simple bellows pump operated piezo-electrically by a piezo-ceramic "Bimorph" "bender" element, which bends on application of a voltage as previously described. In practice the pump is better formed as a double piezo-electrically operated pump as is shown in FIG. 1.

3. Control of Displacement

Figure 8:
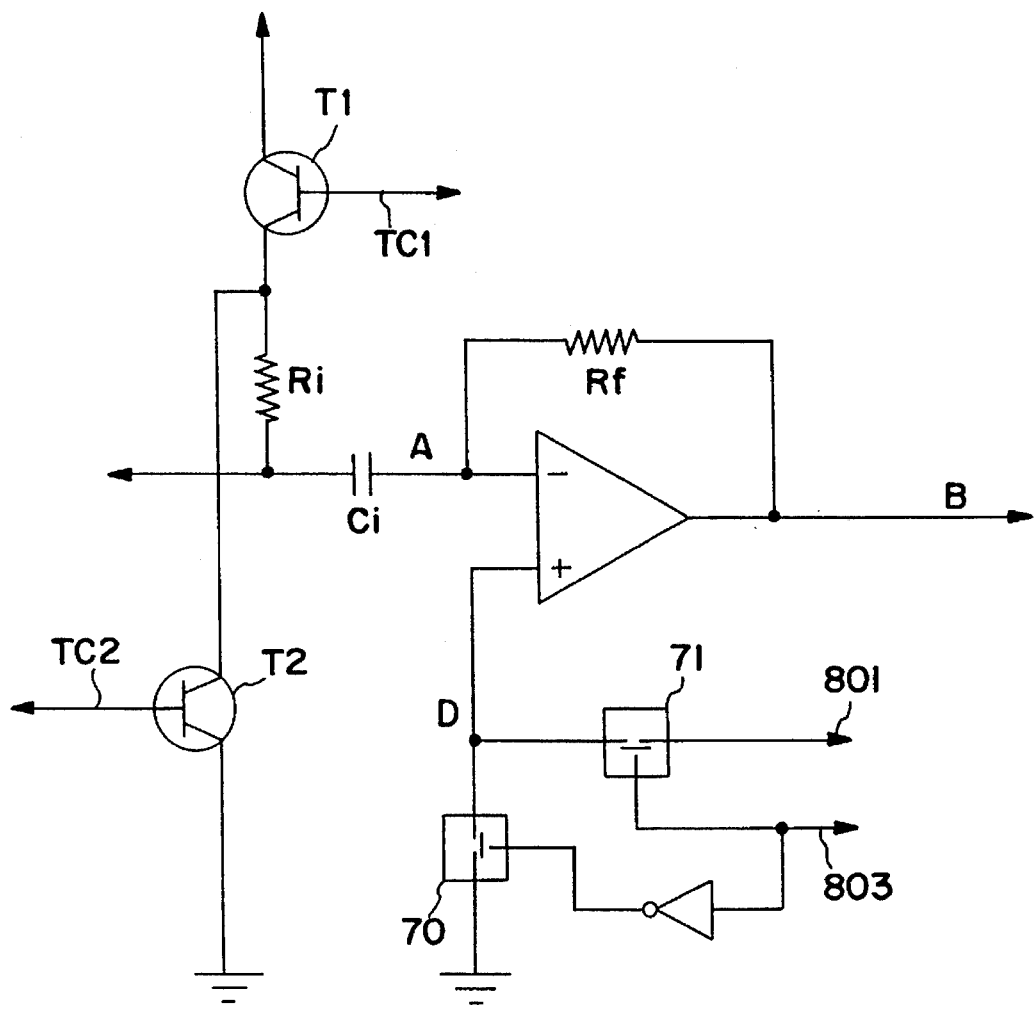
FIG. 8 is a circuit diagram of a modified 10 circuit per electrode of FIG. 4.

The control of buoyancy described above is capable of moving the ball up and down, but not from side to side, and indeed since the maintenance of neutral buoyancy is necessary to maintain resistance to external accelerations, it would not be desirable to use change of buoyancy for this purpose. Some other method is therefore needed to cause small changes in position, so as to maintain the ball central in the housing. The method described preferred here is by simple electrostatic attraction, using the measurement electrodes. The basic method has already been described, a voltage applied to one outer electrode with respect to the local ground potential which is maintained on all the orthogonally disposed electrodes, will attract the ball toward the electrode to which the voltage is applied. This can be accomplished by modifying the input circuit following the outer electrodes as shown in FIG. 8. Capacitor Ci is added, and is selected so as to be very large by comparison to the electrode overlap capacitance. It thus blocks out DC voltages applied to the electrode, without affecting the measurement process. Resistor Ri allows a bias voltage to be applied, either from a voltage source, connected here by the upper transistor T1 switch, or the local ground reference connected here by the lower transistor T2 switch. Ri is selected so that the product RiCi is very much longer than the duration of a single cycle of the ball triangular measurement signal, so again the measurement is not affected. The transistors T1 and T2 or other switches are typically under the control of the microprocessor, connected here by the lower transistor T2 switch so that by using bias on electrodes either singly, or in sequence, the ball can be pulled in any desired direction.

The full process of maintaining the ball in position can now be appreciated. Its displacement within the housing is measured as part of every measurement cycle, so any departure from central positioning will be detected. Small departures will be corrected first using the electrostatic method. However any consistent drift up or down with respect to the understood gravitational vertical would indicate a buoyancy error, which can then be corrected by use of the buoyancy control pump.

4. Powering the Ball

The method of powering the ball has already been briefly described. For the majority of the time an AC signal (probably squarewave) is applied across one or more outer pairs of electrodes (chosen to best coincide at any time to complete overlap with one pair of electrodes on the ball. All electrodes on the ball are connected by low capacitance diodes to a reservoir capacitor, thus the AC signal is rectified and stored. The amount of power transferred this way is proportional to the coupling capacitance of the electrode pairs, and the frequency and amplitude of the drive signal. The ball electronics are essentially low power in nature, and the component values and detail design of the inner circuitry are chosen such that the stored energy in the capacitor is sufficient to maintain the operation during each measurement cycle. The drive signal to power the ball can be conveniently applied using the modification of the input circuit shown in FIG. 8. During the measurement cycle a lower analogue switch 70 is closed, and switch 71 open due to a signal 803 received from the microprocessor, so that the amplifier acts as a differentiator as described above. During the power phase these switch connections are reversed, and a drive signal 801 is applied to point D via switch 71. The amplifer now acts as a simple buffer. By choice of a relatively low value for Rf, this drive signal is then applied via the large capacitor Ci to the electrode as desired. This arrangement is not unique, and other techniques could be applied, but it has the advantage that stray capacitances associated with other connections to the electrodes are eliminated, thus avoiding difficulties with the measurement cycle.

5. Balancing the Ball

For sensors that have a gravitational moment, and are required to float upright, it is clearly important that the mass balance within the ball is accurate. This will be both difficult to determine, and difficult to achieve in manufacture because of the shape and method of construction, and especially where the gravitational moment is made small to increase the natural period of the ball.

Figure 6A:
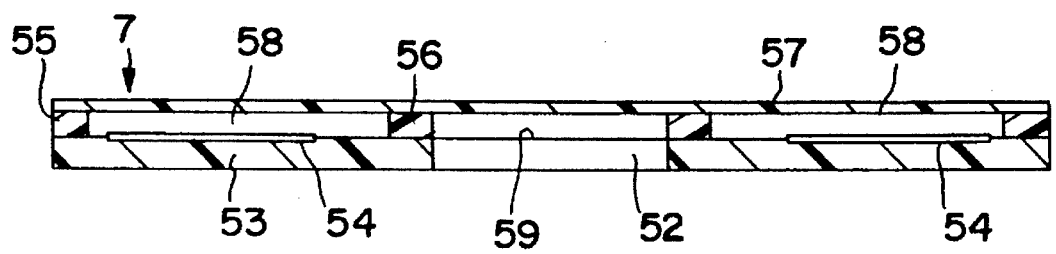

For this reason and for a further reason relating to compass dip, as will be described, a method of balancing the ball after construction, and also rebalancing in service, has been designed. This uses an electrolytic cell, as shown in detail in FIG. 6. It is shown in a sectional plan view in the upper part of the figure, the areas 54 are four electrodes, deposited onto a flat circular surface. In practice these electrodes would probably be copper areas etched on the surface 59 of a normal piece of glass/epoxy printed circuit material of the base 53. The cell would be bounded by a raised edge 55 around the outside, and a similar edge 56 toward the centre (to allow for a hole through which the buoyancy control bellows 13 are placed). The cell is shown in section in FIG. 6A. It would be covered by a thin layer of compliant material 57, so as to seal the cell, but allow for expansion with temperature of the electrolyte in space 58. The shaded area of space 58 represents the electrolyte, in the case of copper electrodes this would be copper sulphate solution. Means for filling and venting the cell, would be needed, these are not shown. The electrode areas make contact with the main electronics of the ball, probably through the thickness of the board. It is clear that by applying a small voltage across an opposite pair of electrodes, metallic material can be shifted from one to the other, with the electrical polarity selecting the direction, so as to directly alter the balance of the cell. More power is needed for this operation than in the normal measurement cycle, so this can be conveniently provided by increasing the drive voltage and frequency. This in turn will lead to an increase in the stored voltage on the main capacitor, which can be used to detect the entry to the auto balance mode, with simple two-bit coding at the beginning of the transmission controlling logic to determine the pair of electrodes to be energised, and the polarity of energisation. With the device placed on a horizontal surface the microprocessor could select alternate measurement and auto balance mode cycles, until a satisfactory balance was achieved.

6. Dip Allowance

The embodiment or embodiments shown suitably have means for allowing for regional changes in strength and dip of the earth's magnetic field.

In magnetic compasses the problem of balance is further compounded: conventionally the gravitational moment holds a compass card horizontal against the dip torque. But if the gravitational moment is made small, as is proposed here, changes in the dip torque may be significant. The torque can be balanced for one magnetic latitude but errors will occur if the compass is moved to another latitude without some mechanism to allow for the change.

Three possible arrangements are proposed.

Figure 12:
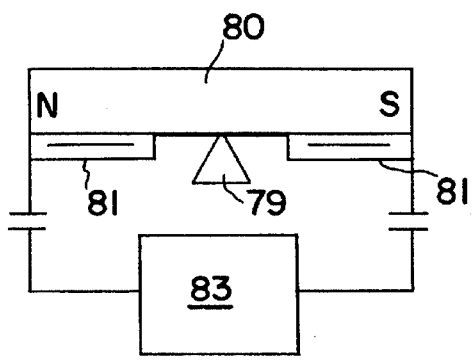
FIGS. 12 and 13 are diagrams of dip correction arrangements.

The first arrangement shown schematically in FIG. 12 uses a variable weight pivoted at 79 about a horizontal axis to keep the card carrying permanent magnet compass elements 80 horizontal as the regional field changes. The schematic representation simply shows movable weights 81 formed as two of the electrolytic cells shown in FIG. 6A whose righting moment is controlled by a microprocessor 83 preprogrammed with a standard tabulation of the geomagnetic field. (This adjustment could also be controlled by hand using external dip and field strength measurements).

Figure 13:
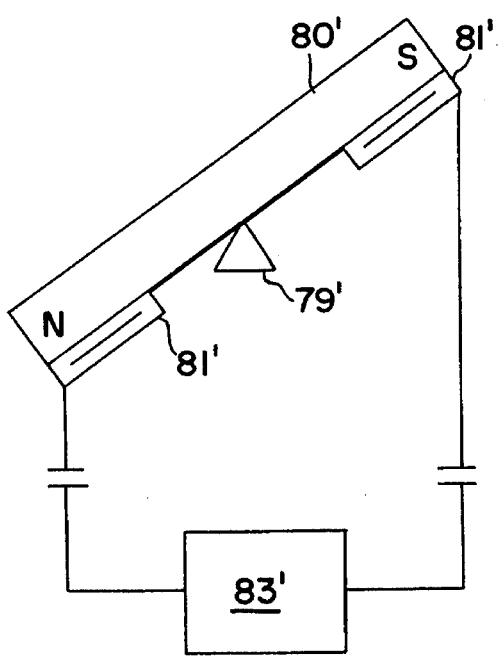

The second arrangement shown in FIG. 13 uses a similar arrangement to that shown in FIG. 12 but the permanent magnets 80' that for the compass or attitude direction sensor are biased to an angle to the horizontal that gives an average torque for the expected operating area of the compass. Fine adjustment, less than that required for the first arrangement will be achieved by the means used in the second arrangement.

Figure 14:
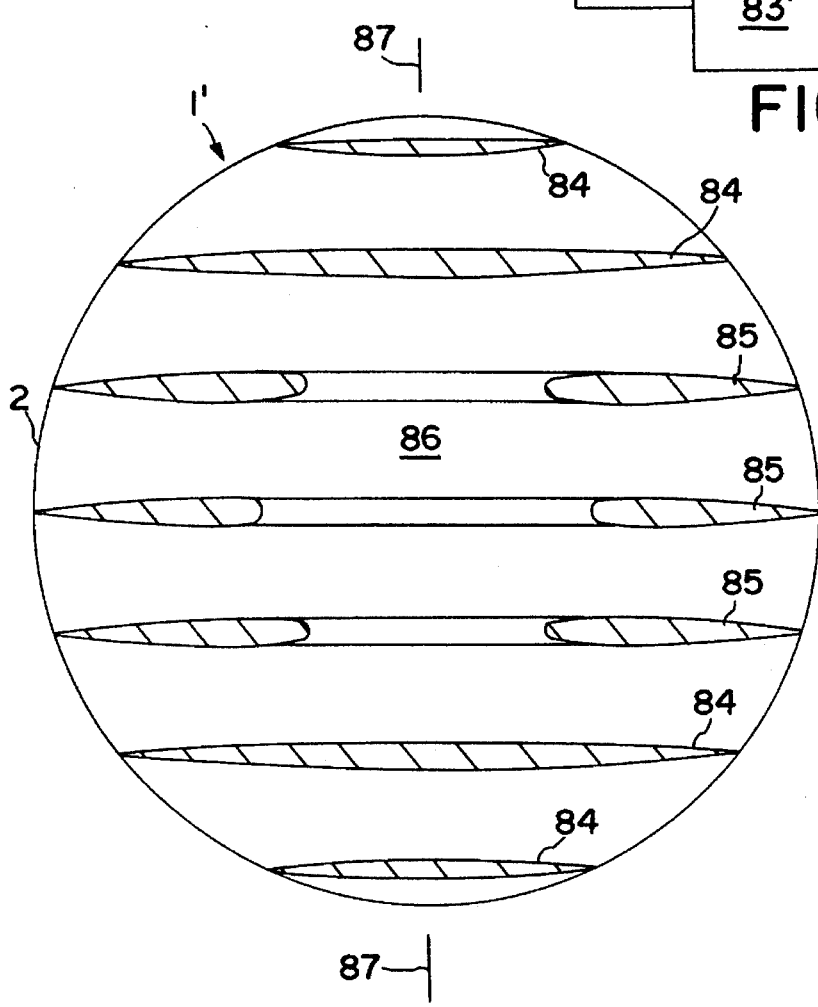
FIG. 14 is a cross section of an alternative ball for that shown in FIG. 1.

The third arrangement shown in FIG. 14 is an alternative ball 1' which uses a passive magnetic element without permanent magnetisation. This consists of one or more fine oblate ellipsoids of revolution 84, 85 of a magnetically soft material such as transformer iron or mumetal. The axial ration of the ellipsoid(s) should be at least 20:20:1 and may be as high as 80:80:1. Magnetisation induced by the earth's magnetic field will produce a torque which will tend to rotate the equatorial plane of the ellipsoid(s) into the vertical magnetic plane containing the earth's field, and so the horizontal axis of the ellipsoid will indicate the azimuth of north. The ellipsoid(s) may be modified by sharpening the circumference so as to improve the definition of the induced magnetisation and may be made annular as at 85 by removing a disc from the centre to make room for other components. In the latter case all corners of the central hole 86 formed by the annular form will be rounded to avoid local intensification of induced magnetisation. The hole 86 enables a buoyancy control bellows as shown in FIG. 1 to be provided. For the sake of clarity this is not shown nor are electrodes 17 for detecting the orientation of the ball. These are similar to those shown in FIGS. 2 or 3. The ellipsoids 84, 85 are mounted on a common axis 87 and are spaced 5 to 10 mm apart for a 5 cm diameter ball so as to minimise magnetic interaction between them while maximising total torque. Because induced magnetisation is automatically aligned with the total field the unit will be insensitive to changes in magnetic latitude. Each ellipsoid is preferably about 0.6 mm to 1.2 mm thick.

We claim:

1. An attitude sensor comprising:
   a housing containing a fluid;

a spherical ball freely suspended in said fluid;

buoyancy control means for ensuring that the ball is neutrally buoyant with respect to said fluid, said buoyancy control means comprising means for altering the buoyancy of said spherical ball, means for measuring the buoyancy of said spherical ball, control means, operatively connected to said means for altering buoyancy and said means for measuring buoyancy, for causing said means for altering buoyancy to alter the buoyancy of said spherical ball to obtain neutral buoyancy with respect to said fluid when said means for measuring buoyancy detects a departure of the buoyancy of said spherical ball from neutral buoyancy with respect to said fluid;

means for maintaining said spherical ball out of direct contract with said housing;

means for detecting orientation of said spherical ball.

2. The sensor as claimed in claim 1, wherein the means for altering the buoyancy of said spherical ball comprises means for pressurizing said fluid in said housing, and a variable volume chamber within said ball in fluid communication with said fluid in said housing.

3. The sensor as claimed in claim 1, wherein said means for maintaining said spherical ball out of direct contact with said housing comprises at least one ball mounted electrode;

a plurality of housing mounted electrodes;

means to apply an electrical potential to at lest one of said housing mounted electrodes to produce an electrostatic force preventing said spherical ball from directly contacting said housing.

4. The sensor as claimed in claim 3, wherein said means for detecting the orientation of said spherical ball comprises means for effecting a capacitive measurement between said at least one ball mounted electrode and said plurality of housing mounted electrodes.

5. The sensor as claimed in claim 1, wherein said ball contains a balancing means comprising a sealed cell oriented in a plane defining a normally horizontal plane with the ball, said sealed cell containing a plurality of metallic electrodes and electrolyte in contact with said plurality of metallic electrodes, control means for selectively electrolysing metallic electrodes to adjust a center of gravity of said ball.

6. The sensor as claimed in claim 1, wherein said ball contains at least one bar magnet.

7. The sensor as claimed in claim 6, wherein said at least one bar magnet is pivotally mounted within said ball for rotation about a normally horizontal axis.

8. The sensor as claimed in claim 1, wherein said spherical ball contains a passive magnetic element comprising one or more circular discs of soft magnetic material with no more than a slight permanent magnetism.

9. The sensor as claimed in claim 8 wherein said one or more circular discs each have an ellipsoidal cross section.

10. The sensor as claimed in claim 1, wherein said spherical ball contains a passive magnetic element comprising one or more circular annuli of soft magnetic material with no more than a slight permanent magnetism.

11. The sensor as claimed in claim 10 wherein said one or more circular annuli each have an ellipsoidal cross section.

* * * * *